United States Patent
Lin et al.

(10) Patent No.: US 8,043,584 B2
(45) Date of Patent: Oct. 25, 2011

(54) METHOD OF RECYCLING CD-112 ISOTOPE

(75) Inventors: Wuu-Jyh Lin, Taoyuan County (TW);
Song-Un Tang, Taoyuan County (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 338 days.

(21) Appl. No.: 11/812,984

(22) Filed: Jun. 22, 2007

(65) Prior Publication Data
US 2011/0108429 A1    May 12, 2011

(51) Int. Cl.
*C22B 17/00* (2006.01)

(52) U.S. Cl. ............ 423/2; 423/11; 423/101; 423/102; 423/103; 423/104; 423/491; 423/566.1; 423/594.18; 205/281; 205/282; 205/369

(58) Field of Classification Search .............. 423/11, 423/101–104, 491, 566.1, 594.18, 2; 205/281, 205/282, 369
See application file for complete search history.

(56) References Cited

FOREIGN PATENT DOCUMENTS
JP          2009-007633      *    1/2009
* cited by examiner

*Primary Examiner* — Steven Bos
(74) *Attorney, Agent, or Firm* — Jackson IPG PLLC; Demian K. Jackson

(57) ABSTRACT

Cd-112 isotope is recycled from a Cd-112 chemical separated solution or a remainder of an electroplating solution having a Cd-112 target. The present invention recycles Cd-112 isotope with a low cost, a high purity and a high recycle rate. The recycled Cd-112 isotope can be easily stored. And, the Cd-112 isotope can be used as an imaging agent in nuclear medicine.

9 Claims, 2 Drawing Sheets

METHOD OF RECYCLING CD-112 ISOTOPE

FIELD OF THE INVENTION

Figure 1:
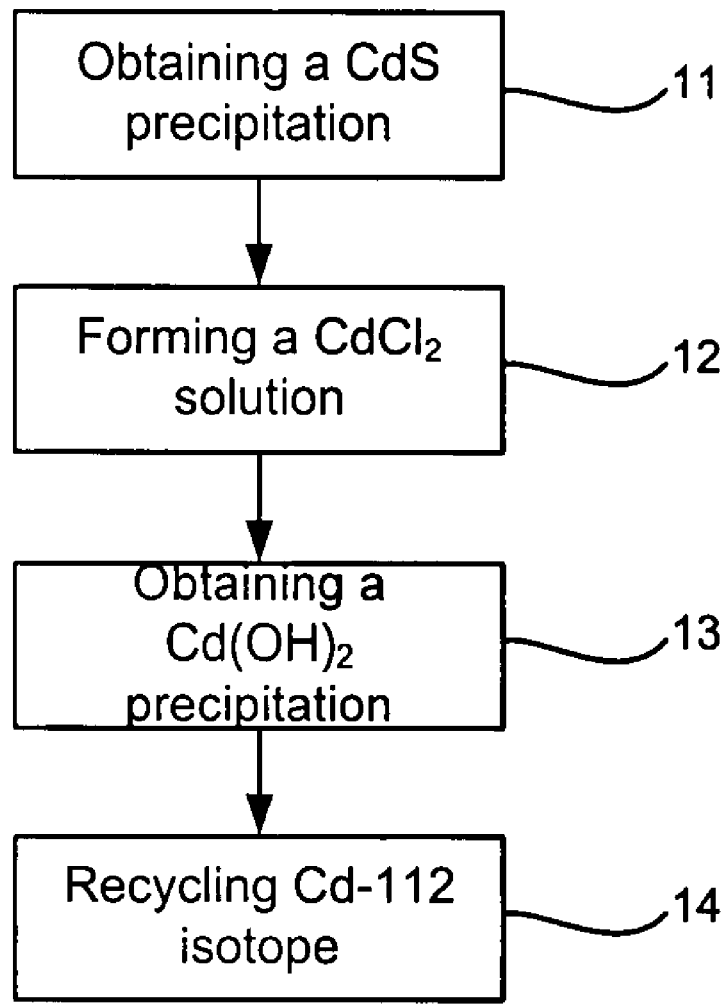

The present invention relates to recycling Cd-112 isotope; more particularly, relates to obtaining a cadmium hydroxide ($Cd(OH)_2$) precipitation by reacting a hydroxide with a chemical separated solution of a Cd-112 target or a remainder of an electroplating solution having a Cd-112 target and thus recycling Cd-112 isotope through filtrating and rinsing the reacted solution having the $Cd(OH)_2$ precipitation.

DESCRIPTION OF THE RELATED ART

In-111 isotope has a nuclear characteristic of trapping electron and releasing two γ-radiation characteristic energy spectrum. Because it has a short half life and a proper energy, the In-111 isotope is widely used in a nuclear single photon emission computerized tomography (SPECT) to diagnose human body diseases and aid in bio-researches.

Some labeled compounds of In-111, like $^{111}InCl3$, $^{111}In$-bleomysin and $^{111}In$-DTPA octreotide, are used to diagnose a local tumor of an organ. Lipophilic complex compound of $^{111}In$-oxine can label leukocytes for imaging a gathering and diagnosing nidus of an inflammation. Complex compounds made of $^{111}In$ together with monoclonal antibody, platelet, globulin or recombinant tissue plasminogen activator (γt-PA) and Fab, $(Fab')_2$ (immunoglobulin fragments) are potential imaging agents newly developed with excellent applications for scanning myocardial infarction and thrombus and for doing bio-researches concerning thrombin and renal functions.

In-111 is generally obtained from $^{112}Cd(p,2n)$, $^{111}Cd(p,n)$, $^{nat}Cd(p,xn)$, $^{110}Cd(d,n)$ or $^{109}Ag(a,2n)$, where the first one has the best production by using a solid $^{112}Cd$ target having a high isotope enrichment with a proper target thickness (~100 μm) and a proper proton beam energy (~22 MeV).

For fabricating $^{111}In$-DTPA octreotide for nuclear medicine through a cyclotron, Cd-112 isotope is required. However, the Cd-112 isotope is not easy to be obtained and its cost is high. Hence, the prior art does not fulfill all users' requests on actual use.

SUMMARY OF THE INVENTION

The main purpose of the present invention is to recycle Cd-112 isotope with a low cost, a high recycle rate and a high purity.

To achieve the above purpose, the present invention is a method of recycling Cd-112 isotope, where Cd-112 isotope is recycled through steps of: (a1) adding a sulfide solution into a remainder of an electroplating solution having a Cd-112 target to obtain a precipitation of cadmium sulfide (CdS); (b1) adding hydrochloric acid into the CdS precipitation to obtain a solution of cadmium chloride ($CdCl_2$); (c1) adding a solution of hydroxide into the $CdCl_2$ solution to obtain a $Cd(OH)_2$ precipitation; and (d1) filtrating and rinsing the $Cd(OH)_2$ precipitation; or, through steps of: (a2) mixing a chemical separated solution of a Cd-112 target and a cadmium bromide ($CdBr_2$) solution to obtain a mixed solution; (b2) adding a solution of a hydroxide into the mixed solution to obtain a $Cd(OH)_2$ precipitation; and (c2) filtrating and rinsing the $Cd(OH)_2$ precipitation. Accordingly, a novel method of recycling Cd-112 isotope is obtained.

BRIEF DESCRIPTIONS OF THE DRAWINGS

Figure 2:
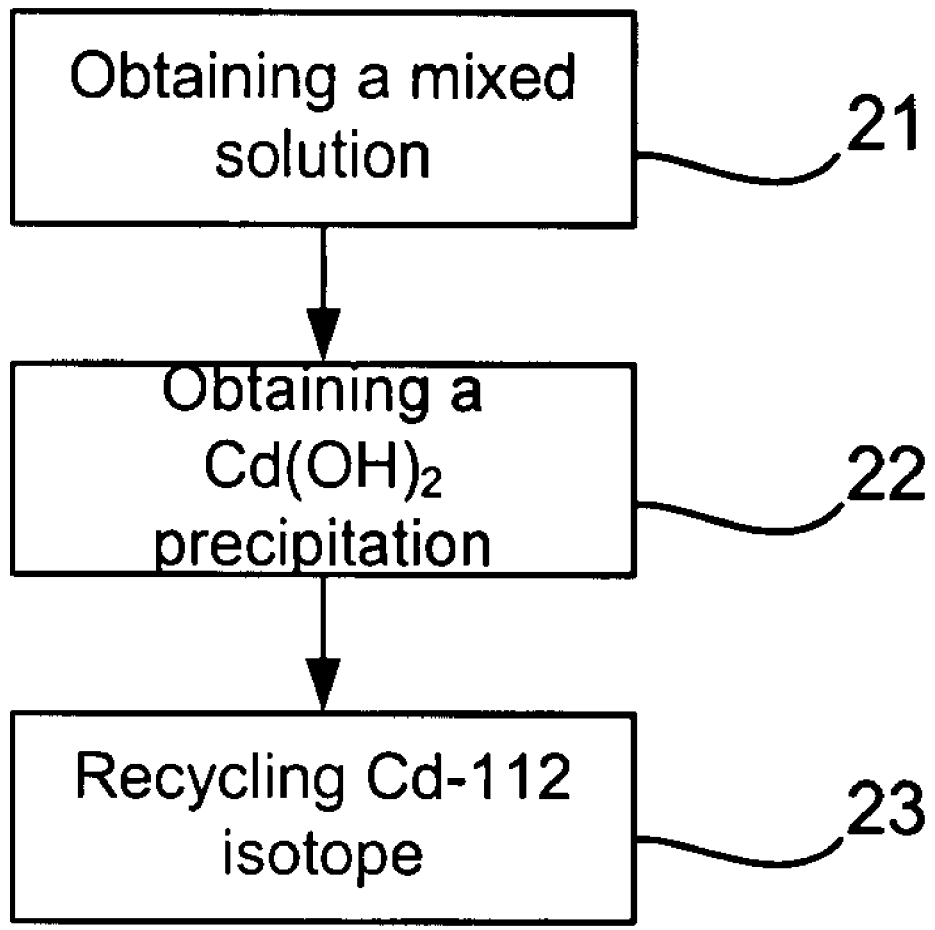

The present invention will be better understood from the following detailed descriptions of the preferred embodiments according to the present invention, taken in conjunction with the accompanying drawings, in which FIG. 1 and FIG. 2 are the views showing the first preferred embodiment and the second preferred embodiment according to the present invention.

DESCRIPTIONS OF THE PREFERRED EMBODIMENTS

The following descriptions of the preferred embodiments are provided to understand the features and the structures of the present invention.

Please refer to FIG. 1, which is a view showing a first preferred embodiment according to the present invention. As shown in the figures, the present invention is a method of recycling Cd-112 isotope, comprising the following steps:

(a1) Obtaining a CdS precipitation 11: A sulfide solution is added to a remainder of an electroplating solution having a Cd-112 target to obtain a precipitation of cadmium sulfide (CdS), where the sulfide solution is a solution of sodium sulfide ($Na_2S$).

(b1) Forming a $CdCl_2$ solution 12: Hydrochloric acid is added to the precipitation of CdS to form a solution of cadmium chloride ($CdCl_2$).

(c1) Obtaining a $Cd(OH)_2$ precipitation 13: A hydroxide solution is added to the $CdCl_2$ solution to obtain a precipitation of cadmium hydroxide ($Cd(OH)_2$), where the hydroxide solution is a solution of sodium hydroxide (Na(OH)) or a solution of potassium hydroxide (K(OH)).

(d1) Recycling Cd-112 isotope 14: The $Cd(OH)_2$ precipitation is moved into a semi-automatic vacuum filtration system to be filtrated and rinsed for recycling Cd-112 isotope.

Please refer to FIG. 2, which is a view showing a second preferred embodiment. As shown in the figures, the present invention is a method of recycling Cd-112 isotope, comprising the following steps:

(a2) Obtaining a mixed solution 21: A chemical separated solution of a Cd-112 target and a cadmium bromide ($CdBr_2$) solution are mixed to obtain a mixed solution.

(b2) Obtaining a $Cd(OH)_2$ precipitation 13: A hydroxide solution is added to the mixed solution to obtain a precipitation of $Cd(OH)_2$, where the hydroxide solution is a solution of Na(OH) or a solution of K(OH).

(c2) Recycling Cd-112 isotope 14: The $Cd(OH)_2$ precipitation is moved into a semi-automatic vacuum filtration system to be filtrated and rinsed for recycling Cd-112 isotope.

The Cd-112 isotope recycled by the above two embodiments can be calcined to obtain a solid cadmium oxide (CdO); or can be added with a solution of cyanide and an alkaline solution to obtain an electroplating solution having a Cd-112 target, where the Cd-112 isotope can be easily stored. The recycle rate of Cd-112 isotope through using the present invention is more than 98% with a purity rate more than 99%.

To sum up, the present invention is a method of recycling Cd-112 isotope, where Cd-112 isotope is recycled with a recycle rate more than 98% and a purity rate more than 99%; and, thus, a cost for purchasing Cd-112 is reduced and further a cost for a nuclear medicine is lowered as well.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of recycling a Cd-112 isotope, comprising steps of:

adding a sulfide solution to an electroplating solution having said Cd-112 isotope as a target to obtain a precipitate of cadmium sulfide;

adding hydrochloric acid to said precipitate of CdS to obtain a solution of cadmium chloride;
adding a solution of hydroxide to said solution of $CdCl_2$ to obtain a precipitate of cadmium hydroxide; and
filtering and rinsing said precipitate of $Cd(OH)_2$ to separate out said Cd-112 isotope.

2. The method according to claim 1,
wherein said sulfide solution is a solution of sodium sulfide.

3. The method according to claim 1,
wherein said solution of hydroxide is selected from the group consisting of a solution of sodium hydroxide and a solution of potassium hydroxide.

4. The method according to claim 1,
wherein said Cd-112 is calcined to obtain solid cadmium oxide.

5. The method according to claim 1,
wherein said Cd-112 is added to a solution of cyanide and an alkaline solution to obtain an electroplating solution having said Cd-112 isotope.

6. A method of recycling a Cd-112 isotope, comprising steps of:
mixing a solution of said Cd-112 isotope as a target and a cadmium bromide solution to obtain a mixed solution;
adding a solution of a hydroxide to said mixed solution to obtain a precipitate of $Cd(OH)_2$; and
filtering and rinsing said precipitate of $Cd(OH)_2$ to separate out said Cd-112 isotope.

7. The method according to claim 6,
wherein said solution of hydroxide is selected from the group consisting of a solution of NaOH and a solution of KOH.

8. The method according to claim 6,
wherein said Cd-112 is calcined to obtain solid CdO.

9. The method according to claim 6,
wherein said Cd-112 isotope is added to a solution of cyanide and an alkaline solution to obtain an electroplating solution having said Cd-112 isotope.

* * * * *